US009719393B2

(12) United States Patent
Golin et al.

(10) Patent No.: US 9,719,393 B2
(45) Date of Patent: Aug. 1, 2017

(54) EXHAUST SYSTEM FOR DUAL FUEL ENGINES

(71) Applicant: Tenneco Automotive Operating Company Inc., Lake Forest, IL (US)

(72) Inventors: Michael Golin, Dexter, MI (US); Adam J. Kotrba, Laingsburg, MI (US); Robert Applegate, Linden, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 233 days.

(21) Appl. No.: 14/732,833

(22) Filed: Jun. 8, 2015

(65) Prior Publication Data

US 2015/0267584 A1 Sep. 24, 2015

Related U.S. Application Data

(62) Division of application No. 13/804,027, filed on Mar. 14, 2013, now Pat. No. 9,057,303.

(51) Int. Cl.
*F01N 3/00* (2006.01)
*F01N 3/20* (2006.01)
*F01N 9/00* (2006.01)

(52) U.S. Cl.
CPC ......... *F01N 3/2053* (2013.01); *F01N 3/2006* (2013.01); *F01N 3/2066* (2013.01); *F01N 9/00* (2013.01); *F01N 2240/14* (2013.01); *F01N 2240/16* (2013.01); *F01N 2240/36* (2013.01); *F01N 2410/00* (2013.01); *F01N 2560/026* (2013.01); *Y02T 10/24* (2013.01);

(Continued)

(58) Field of Classification Search
CPC ............ F01N 2240/14; F01N 2240/16; F01N 2240/36; F01N 2410/00; F01N 2560/026; F01N 3/2006; F01N 3/2053; F01N 3/2066; F01N 9/00; Y02T 10/24; Y02T 10/26; Y02T 10/36; Y02T 10/47
See application file for complete search history.

(56) References Cited

U.S. PATENT DOCUMENTS 5,014,509 A 5/1991 Broering et al.
5,937,637 A 8/1999 Fujishita et al.
(Continued)

FOREIGN PATENT DOCUMENTS

EP  2332826 A1  6/2011
JP  2007-331484 A  12/2007
JP  2007-331670 A  12/2007

*Primary Examiner* — Jesse Bogue
(74) *Attorney, Agent, or Firm* — Harness, Dickey & Pierce, P.L.C.

(57) ABSTRACT

An exhaust system for a dual-fuel engine includes an exhaust treatment component in an exhaust passageway. The exhaust treatment component is configured to treat exhaust from the combustion of a second fuel and not from combustion of a first fuel. A thermal enhancement device is in communication with the exhaust passageway and positioned upstream from the exhaust treatment component. A controller activates and deactivates the thermal enhancement device based on switching from the first fuel to the second fuel, wherein the first fuel has a higher sulfur content than the second fuel. The thermal enhancement device increases the temperature of an exhaust to combust a residual amount of the first fuel present in the exhaust passageway during the switch between the first fuel and the second fuel.

15 Claims, 4 Drawing Sheets

(52) U.S. Cl.
CPC .............. *Y02T 10/26* (2013.01); *Y02T 10/36* (2013.01); *Y02T 10/47* (2013.01)

(56) References Cited

U.S. PATENT DOCUMENTS

| | | |
|---|---|---|
| 7,398,645 B2 | 7/2008 | Zheng et al. |
| 7,640,731 B2 | 1/2010 | Huang |
| 8,161,732 B2 | 4/2012 | Peters et al. |
| 8,261,534 B2 | 9/2012 | Sano et al. |
| 2004/0231650 A1* | 11/2004 | Gray, Jr. ................ F01N 3/035 123/568.12 |
| 2006/0213197 A1 | 9/2006 | Caro et al. |
| 2008/0209897 A1* | 9/2008 | Urven ..................... F01N 3/025 60/303 |
| 2009/0293452 A1 | 12/2009 | Tarabulski |
| 2010/0263352 A1 | 10/2010 | Hylands et al. |
| 2011/0061371 A1 | 3/2011 | Cavataio et al. |
| 2011/0289906 A1 | 12/2011 | Morley et al. |
| 2011/0314794 A1 | 12/2011 | Geyer |
| 2012/0078487 A1 | 3/2012 | Light-Holets |
| 2014/0316677 A1* | 10/2014 | Stockner ............ F02D 19/0694 701/103 |

* cited by examiner

EXHAUST SYSTEM FOR DUAL FUEL ENGINES

CROSS-REFERENCE TO RELATED APPLICATIONS

This application is a divisional of U.S. patent application Ser. No. 13/804,027 filed on Mar. 14, 2013. The entire disclosure of the above application is incorporated herein by reference.

FIELD

The present disclosure relates to engine exhaust systems for dual-fuel engines.

BACKGROUND

This section provides background information related to the present disclosure which is not necessarily prior art.

Engines that operate on dual fuels are common in the marine industry where various emission regulations may be in effect in coastal areas, but not in effect while out to sea at a predetermined distance from land. For example, the engine on a marine vessel may operate using a lower-sulfur-containing fuel while close to shore, and operate using a high-sulfur-containing fuel while out at sea.

Combustion of sulfur-containing fuels produces exhaust including sulfur. The sulfur in the exhaust can increase production of sulfur oxides ($SO_x$) that may be detrimental to the environment. Further, the sulfur in the exhaust can react with exhaust after-treatment reagents to produce by-products such as ammonia bi-sulfate. After prolonged periods of exposure to ammonia bi-sulfates, catalyst-coated substrates of an exhaust after-treatment system can become plugged, which reduces the efficacy of the exhaust after-treatment system.

Some fuels are more apt to producing ammonia bi-sulfates, including fuels having a higher sulfur content. To address these concerns, fuel suppliers have developed lower sulfur content fuels. Fuels having lower sulfur content, however, are more expensive due to the increased costs in production of the fuels. In view of these fuel costs, the above-noted dual fuel engines have been developed. During a fuel switch, however, it is not uncommon for residual fuel to remain in the exhaust system. If the fuel in the exhaust system has a higher sulfur content, the residual fuel can produce greater amounts of ammonia bi-sulfate that can, over prolonged periods, plug the catalyst-coated substrates of the exhaust after-treatment system.

SUMMARY

This section provides a general summary of the disclosure, and is not a comprehensive disclosure of its full scope or all of its features.

The present disclosure provides an exhaust system for a dual-fuel engine that is provided with a first fuel and a second fuel. The exhaust system includes an exhaust passageway, with an exhaust treatment component provided in the exhaust passageway. A thermal enhancement device communicates with the exhaust passageway and is located upstream from the exhaust treatment component, wherein the thermal enhancement device is operable to raise a temperature of an exhaust located in the exhaust passageway during a switch between the first fuel and the second fuel that is provided to the dual-fuel engine. The exhaust treatment system can also include a by-pass pipe in communication with the exhaust passageway that by-passes the exhaust treatment component wherein, during combustion of the first fuel by the dual-fuel engine, the by-pass pipe is open. During combustion of the second fuel by the dual-fuel engine, the by-pass pipe is closed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
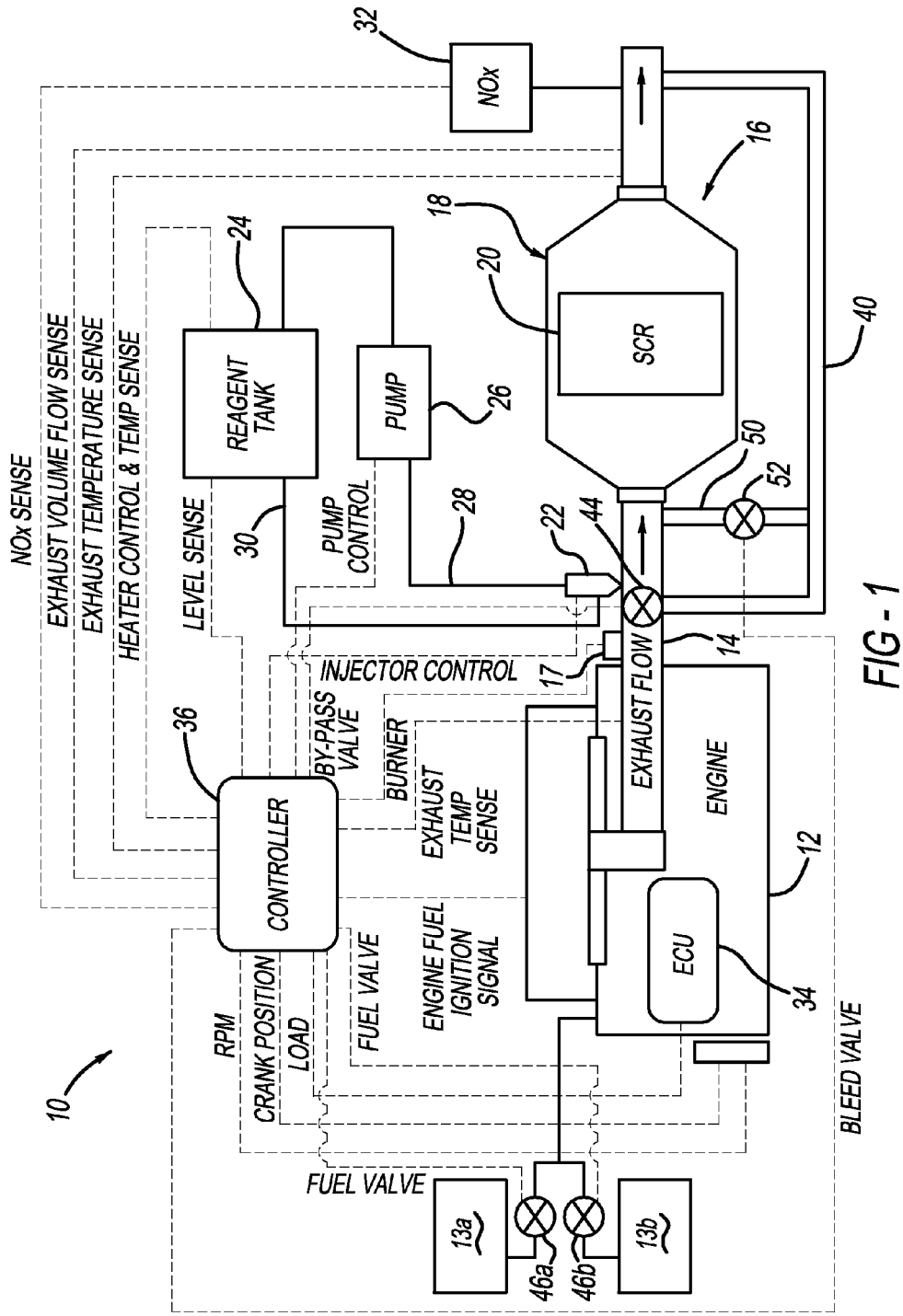
FIG. 1 is a schematic representation of an exhaust system according to the present disclosure.

FIG. 1 schematically illustrates an exhaust system 10 according to the present disclosure. Exhaust system 10 can include at least an engine 12 in communication with a pair of fuel source 13a and 13b that, once combusted, will produce exhaust gases that are discharged into an exhaust passage 14 having an exhaust after-treatment system 16. Fuel sources 13a and 13b contain different fuels. For example, fuel source 13a can include a low sulfur diesel fuel (LSF), while fuel source 13b can include an ultra-low-sulfur diesel fuel (ULSF). Other exemplary fuels that can be used include marine gas oil (MOO), marine diesel oil (MDO), intermediate fuel oil (IFO), heavy fuel oil (HFO), combinations of natural gas and diesel fuel, or blends of natural gas with hydrogen. Further, it should be understood that any combination of the above-mention fuels can be stored in fuel sources 13a and 13b.

Downstream from engine 12 can be disposed an exhaust treatment component 18, which can include a diesel oxidation catalyst (DOC), a catalyst-coated diesel particulate filter (DPF) component or, as illustrated, a selective catalytic reduction (SCR) component 20. Although an SCR component 20 is illustrated, it should be understood that SCR component 20 can also include therein a DOC or a DPF. Further, SCR component 20 can be an SCR catalyst-coated DPF or an SCR catalyst-coated flow-through filter (FTF).

Exhaust after-treatment system 16 can further include components such as a thermal enhancement device or burner 17 to increase a temperature of the exhaust gases passing through exhaust passage 14. Increasing the temperature of the exhaust gas is favorable to achieve light-off of the catalyst in the exhaust treatment component 18 in cold-weather conditions and upon start-up of engine 12, as well as initiate regeneration of the exhaust treatment component 18 when the exhaust treatment component 18 is a DPF.

To assist in reduction of the emissions produced by engine 12, exhaust after-treatment system 16 can include an injector or dosing module 22 for periodically dosing an exhaust treatment fluid into the exhaust stream. As illustrated in FIG. 1, dosing module 22 can be located upstream of exhaust treatment component 18, and is operable to inject an exhaust treatment fluid into the exhaust stream. In this regard, dosing module 22 is in fluid communication with a reagent tank 24 and a pump 26 by way of inlet line 28 to dose an exhaust treatment fluid such as diesel fuel, urea, or gaseous ammonia into the exhaust passage 14 upstream of exhaust treatment component 18. Tank 24 may store liquid exhaust treatment fluids, or may store solid or gaseous ammonia. Other materials that can be used to enhance exhaust treatment in combination with urea can be ethanol or hydrogen that may be stored in a separate tank (not shown).

Dosing module 22 can also be in communication with reagent tank 24 via return line 30. Return line 30 allows for any exhaust treatment fluid not dosed into the exhaust stream to be returned to reagent tank 24. Flow of the exhaust treatment fluid through inlet line 28, dosing module 22, and return line 30 also assists in cooling dosing module 22 so that dosing module 22 does not overheat. Although not illustrated in the drawings, dosing module 22 can be configured to include a cooling jacket that passes a coolant around dosing module 22 to cool it.

The amount of exhaust treatment fluid required to effectively treat the exhaust stream may vary with load, engine speed, exhaust gas temperature, exhaust gas flow, engine fuel injection timing, desired $NO_x$ reduction, barometric pressure, relative humidity, EGR rate and engine coolant temperature. A $NO_x$ sensor or meter 32 may be positioned downstream from SCR 20. $NO_x$ sensor 32 is operable to output a signal indicative of the exhaust $NO_x$ content to an engine control unit (ECU) 34. All or some of the engine operating parameters may be supplied from ECU 34 via the engine/vehicle databus to an exhaust system controller 36. The exhaust system controller 36 could also be included as part of the ECU 34. Exhaust gas temperature, exhaust gas flow and exhaust back pressure and other vehicle operating parameters may be measured by respective sensors, as indicated in FIG. 1.

The amount of exhaust treatment fluid required to effectively treat the exhaust stream can also be dependent on the size of the engine 12. In this regard, large-scale diesel engines used in locomotives, marine applications, and stationary applications can have exhaust flow rates that exceed the capacity of a single dosing module 22. Accordingly, although only a single dosing module 22 is illustrated for urea dosing, it should be understood that multiple dosing modules 22 for urea injection are contemplated by the present disclosure.

During operation of engine 12, as noted above, the type of fuel provided to engine 12 can be switched between different fuel sources 13a and 13b. In the case where fuel sources 13a and 13b carry fuels with different sulfur contents, respectively, it should be understood that when engine 12 is using the fuel with a higher sulfur content, after-treatment system 16 is not necessarily being utilized. That is, when engine 12 is a marine application where the vessel is located a predetermined distance from shore, emission regulations may not require use of after-treatment system 16. Accordingly, any exhaust produced by engine 12 while using a high-sulfur-content fuel (or any type of fuel) may be expelled into the atmosphere without passing through after-treatment system 16. To expel exhaust directly into the atmosphere before reaching after-treatment system 16, exhaust system 10 may include an after-treatment by-pass pipe 40. A valve 44 may be positioned at an inlet of by-pass pipe 40 to allow exhaust gas to flow through by-pass pipe 40 or through after-treatment system 16. Valve 44 is communications with controller 36 or ECU 34. If engine 12 is operating on a high-sulfur-content fuel, controller 36 or ECU 34 can instruct valve 44 to open by-pass pipe 40 and close exhaust passage 14 downstream of valve 44 to allow exhaust to escape into the atmosphere without passing through after-treatment system 16. Similarly, if engine 12 is being operated in an area where emission regulations require exhaust after-treatment, controller 36 or ECU 34 can instruct valve 44 to close by-pass pipe 40 to allow exhaust to pass through after-treatment system 16.

Exhaust produced through combustion of fuels that contain sulfur can be more apt to produce by-products that can plug SCR 20. For example, when exhaust produced through combustion of sulfur-containing fuel passes through exhaust after-treatment system 16 and urea is the reagent being dosed into the exhaust stream by injector 22, ammonium bisulfate $[NH_4]^+[HSO_4]^-$ can be produced, which after long periods of exposure to SCR 20 can plug SCR 20. Although any sulfur-containing fuel can produce ammonium bisulfate, fuels having a lower sulfur content are less apt to produce ammonium bisulfate. Accordingly, it is preferable that exhaust produced through combustion of higher-sulfur-containing fuels by engine 12 is not passed through after-treatment system 16, but rather expelled through by-pass pipe 40 before passing through SCR 20.

In the event of a fuel switch between a high-sulfur-containing fuel and a lower-sulfur-containing fuel during operation of engine 12, however, it can be common for un-combusted fuel droplets of the high-sulfur-containing fuel to continue into the exhaust stream during the fuel switch. The residual fuel in the exhaust can react with the urea to produce ammonium bisulfate, which over prolonged periods can plug SCR 20. To prevent, or at least substantially minimize residual high-sulfur-containing fuel present in the exhaust stream from forming ammonium bisulfate, burner 17 can be operated for a predetermined period of time to fully combust any residual high-sulfur-containing fuel present in the exhaust stream.

Figure 2:
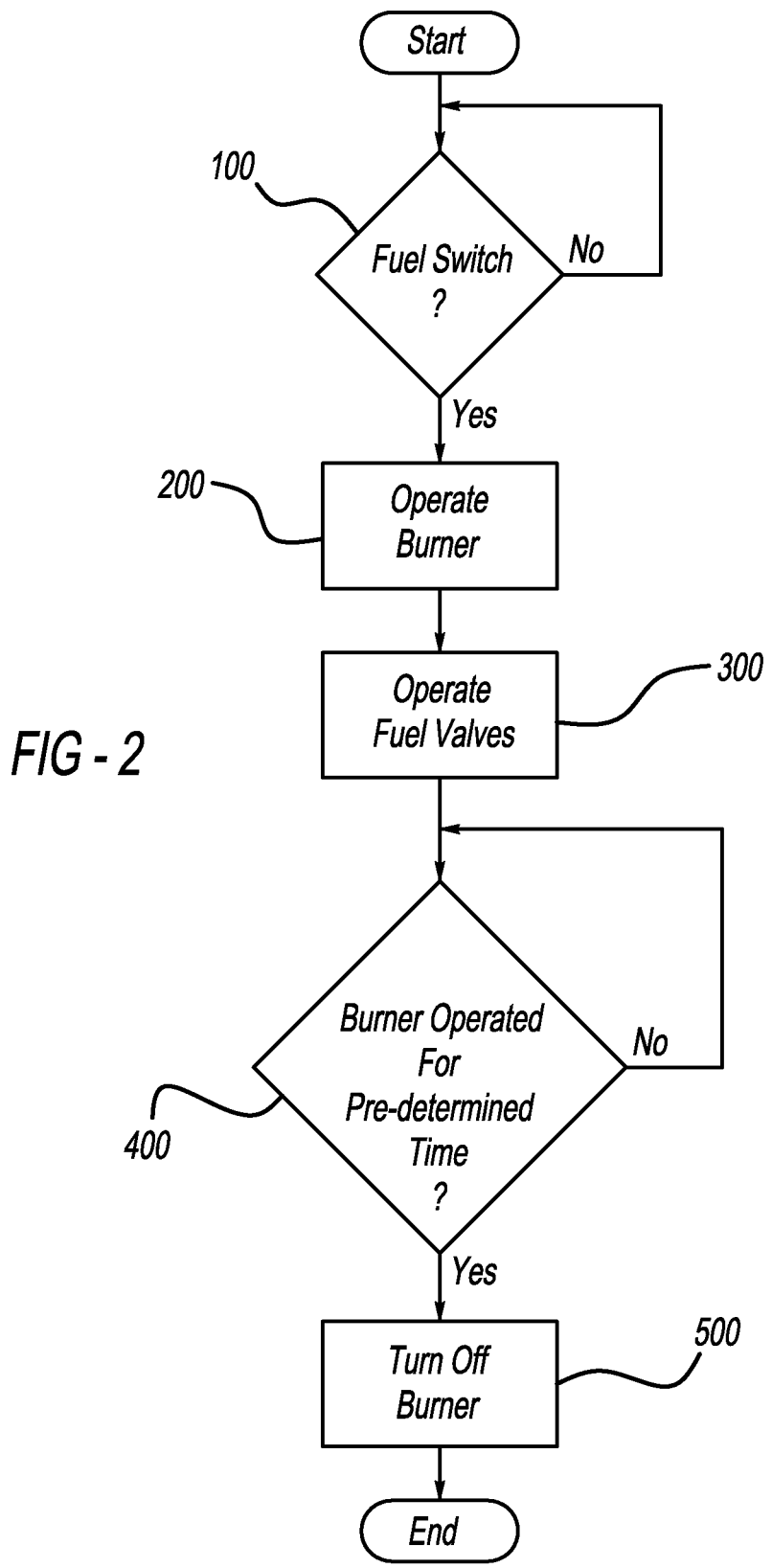
FIG. 2 is a flow-chart schematically illustrating a method according to a principle of the present disclosure.
Figure 3:
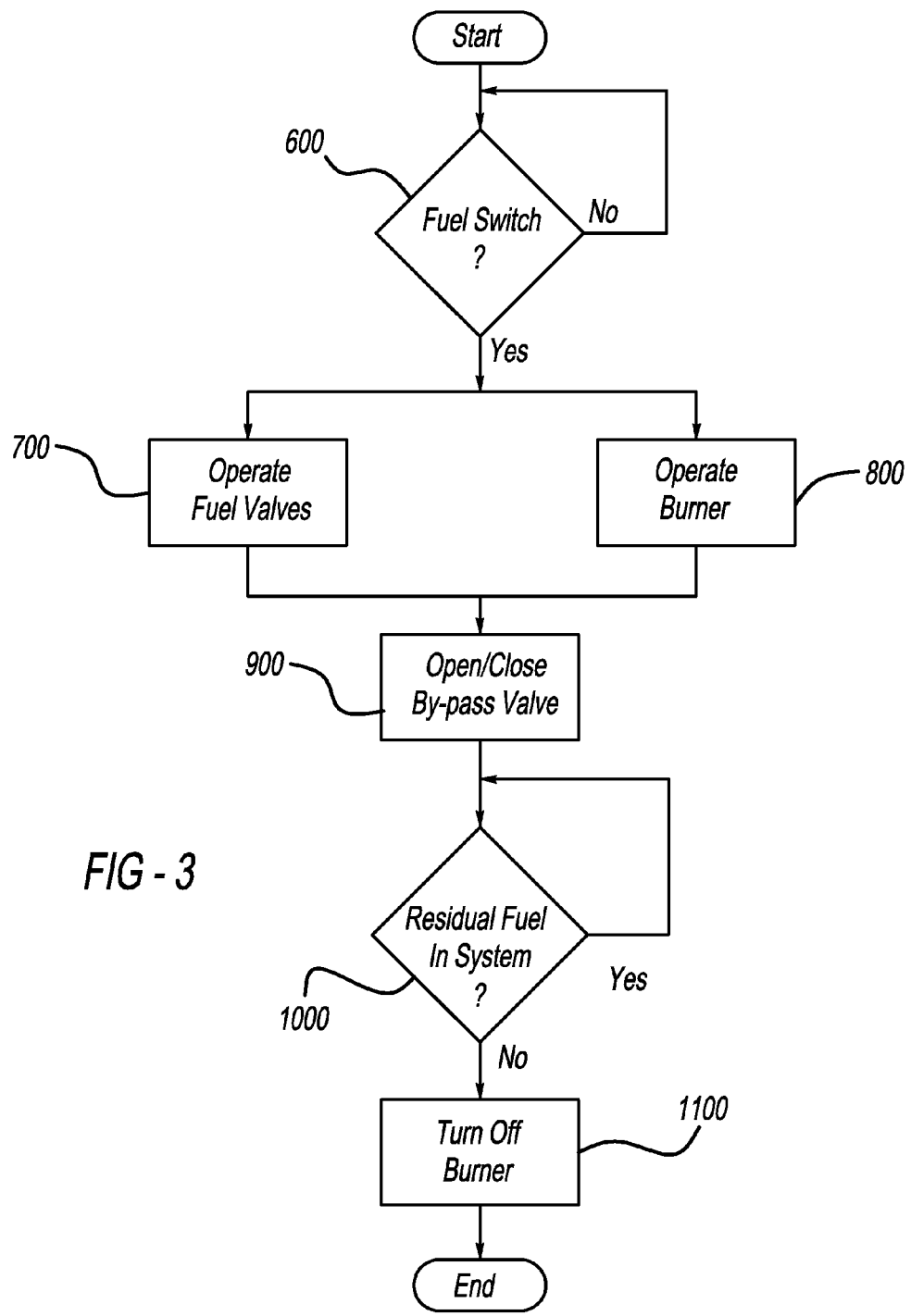
FIG. 3 is a flow-chart schematically illustrating another method according to a principle of the present disclosure.

Referring to FIGS. 2 and 3, control algorithms of the present disclosure will now be described. Fuel provided by fuel tanks 13a and 13b to engine 12 is controlled through valves 46a and 46b, respectively. Valves 46a and 46b are in communication with controller 36 and/or ECU 34. When it is desired to switch between fuels provided by tanks 13a and 13b, controller 36 or ECU 34 can instruct valves 46a and 46b to either open or close. For example, if engine 12 is switching to a lower-sulfur-containing fuel from a higher-sulfur-containing fuel, controller 36 or ECU 34 can instruct valve 46a to close and instruct valve 46b to open. Before controller 36 or ECU 34 sends instructions to valves 46a and 46b to either open or close, controller 36 or ECU 34 can instruct burner 17 to be activated to raise exhaust temperatures to an extent where any un-combusted fuel present in the exhaust stream can be combusted (e.g., 300 C). In this regard, if a fuel switch is desired, controller 36 or ECU 34 can signal instruct burner 17 to activate, and delay actuation of valves 46a and 46b until burner 17 has operated for a predetermined period of time.

Although it is preferable to activate burner 17 before switching fuels, it should be understood that controller 36 or ECU 34 can activate burner 17 simultaneously with the fuel switch, or immediately following the fuel switch, without departing from the scope of the present disclosure. Regardless, during a fuel switch burner 17 should be operated for a duration (e.g., 5-10 minutes) sufficient to combust any unused fuel in the exhaust stream. In this manner, unnecessary by-products that can plug SCR 20 can be eliminated, or at least substantially minimized.

Although not required by the present disclosure, it should be understood that valve 44 can be controlled to open by-pass pipe 40 during the fuel switch while burner 17 is activated. When the fuel switch is complete and burner 17 is deactivated, valve 44 can close by-pass pipe 40 and allow the exhaust to pass through exhaust after-treatment system 16. In this manner, it can be ensured that any un-combusted high-sulfur-containing fuel can be prevented from reaching SCR 20.

Moreover, valve 44 can be designed to be synchronized with fuel valves 46a and 46b. That is, if a signal is sent by controller 36 to fuel valve 46b to open such that engine 12 can operate on a lower-sulfur-containing fuel, valve 44 can simultaneously receive a signal to close by-pass pipe 40 to allow exhaust to travel through exhaust after-treatment system 16. Similarly, if a signal is sent by controller 36 to open fuel valve 46a such that engine 12 can operate on a higher-sulfur-containing fuel, valve 44 can simultaneously receive a signal to open by-pass pipe 40 to allow exhaust to be expelled into the atmosphere before passing through after-treatment system 16.

According to another aspect of the present disclosure, a bleed passageway 50 (FIG. 1) provides communication between by-pass pipe 40 and a position located upstream of SCR 20. Bleed passageway 50 can communicate a portion of the exhaust travelling through by-pass pipe 40 to the position of exhaust passage 14 located upstream SCR 20. More specifically, if engine 12 is operating in a manner where exhaust is being expelled into the atmosphere through by-pass pipe 40 without passing through after-treatment system 16, SCR 20 may be at a temperature that is substantially less than the exhaust temperature. When it is desired to pass the exhaust through after-treatment system 16, valve 44 will be actuated to close by-pass pipe 40 and allow exhaust to enter after-treatment system 16 and the relatively cold SCR. The temperature difference between the exhaust gas and SCR 20 may be greater than optimal, especially during a fuel switch when burner 17 is activated to combust unburned fuel and raise the exhaust temperature. A thermal shock event may occur that may cause the substrate (not shown) of SCR 20 to fracture.

To prevent SCR 20 from experiencing large temperature differences that can fracture the substrates of SCR 20, bleed passageway 50 can provide a predetermined or metered amount of exhaust flow to SCR 20 to slowly raise the temperature of SCR 20. A bleed valve 52 can be provided in bleed passageway 50 to allow exhaust gas to enter bleed passageway 50 and travel back to exhaust passage 14 at a position located upstream from SCR 20. Bleed valve 52 can be controlled by controller 36 or ECU 34, and can be instructed to open if after-treatment system 16 is to be utilized. As exhaust gas is provided to SCR 20 over a period of time, the temperature of SCR 20 will be raised to an extent such that a large temperature gradient will not be experienced by SCR 20 after valve 44 closes by-pass pipe 40.

Bleed valve 52 can also be instructed to open in correspondence with a fuel switch instruction being sent to valves 46a and 46b. For example, if a fuel switch occurs between a high-sulfur-containing fuel and a lower-sulfur-containing fuel, controller 36 or ECU 34 can instruct bleed valve 52 to open bleed passageway 50 and allow a metered amount of exhaust gas to be supplied to SCR 20 over the duration of the fuel switch. The metered amount of exhaust allowed to reach SCR 20 will allow the temperature of SCR 20 to be raised to an extent such that a large temperature gradient will not be experienced by SCR 20 after valve 44 closes by-pass pipe 40.

Now referring to FIG. 2, a method of eliminating residual fuel in the exhaust that may occur during a fuel switch will be described. In step 100, controller 36 will determine whether a fuel switch has been requested during operation of engine 12. If a fuel switch has been requested, controller 36 or ECU 34 can instruct burner 17 to activate (step 200). Following activation of burner 17, fuel valves 46a and 46b can be actuated to switch between the respective fuels stored in tanks 13a and 13b (step 300). During the switch between fuels, burner 17 can be operated for a predetermined period of time (e.g., 10-15 minutes) sufficient to ensure that residual fuel in the exhaust is combusted (step 400). After the predetermined period of time elapses, burner 17 may be deactivated (step 500). In this manner, the production of ammonia bisulfate can be substantially reduced to prevent plugging of SCR 20 over prolonged periods of operation.

Now referring to FIG. 3, a method of operating exhaust system 16 during a switch between a lower-sulfur-containing fuel to a high-sulfur-containing fuel will be described. In step 600, controller 36 or ECU 34 can determine whether a fuel switch has been requested. If such a switch has been requested, controller 36 or ECU 34 can instruct fuel valves 46a and 46b to actuate to switch between the different fuels (step 700), as well as instruct burner 17 to activate (step 800). As discussed above, burner 17 can be activated prior to the actuation of valves 46a and 46b, simultaneously activated with valves 46a and 46b, or activated immediately following actuation of valves 46a and 46b without departing from the scope of the present disclosure.

After actuation of valves 46a and 46b and burner 17, controller 36 or ECU 34 can instruct by-pass valve 44 to open by-pass pipe 40 to allow exhaust produced during combustion of the high-sulfur-containing fuel to by-pass SCR 20 (step 900). During the switch between fuels, burner 17 can be operated for a predetermined period of time sufficient (e.g., 10-15 minutes) to ensure that residual lower-sulfur-containing fuel is combusted (step 1000). After the predetermined period of time elapses, burner 17 may be deactivated (step 1100). Because exhaust gases produced through the combustion of the high-sulfur-containing fuel are expelled to the atmosphere without passing through SCR 20, the production of ammonia bisulfate can be substantially reduced to prevent plugging of SCR 20 over prolonged periods of operation.

Figure 4:
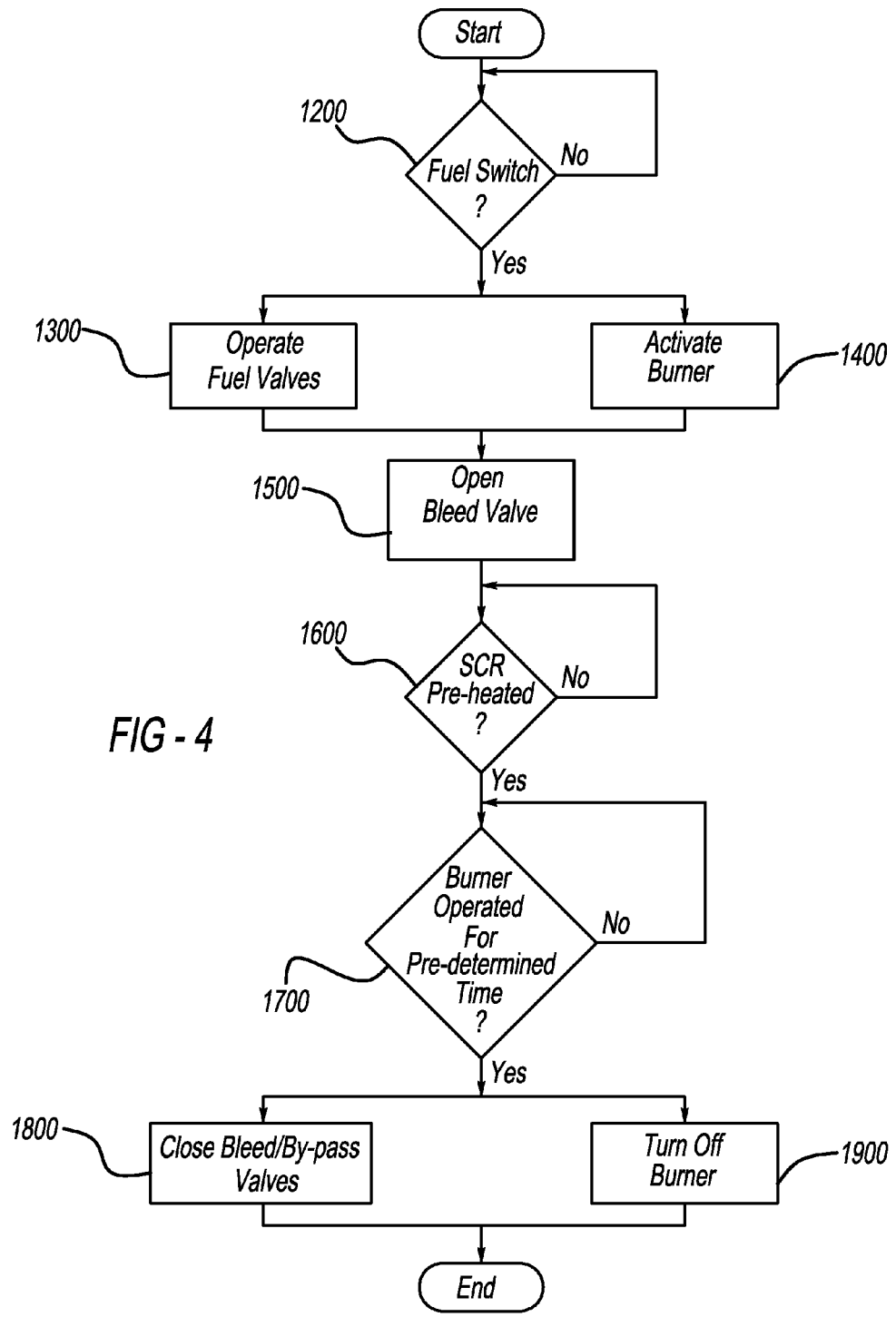
FIG. 4 is a flow-chart schematically illustrating another method according to a principle of the present disclosure.

With reference to FIG. 4, a method of pre-heating SCR 20 during a fuel switch between a high-sulfur-containing fuel to a lower-sulfur-containing fuel will be described. In step 1200, controller 36 or ECU 34 can determine whether a switch between the high-sulfur-containing fuel to the lower-sulfur-containing fuel has been requested. If such a switch has been requested, controller 36 or ECU 34 can instruct fuel valves 46a and 46b to actuate to effect the switch between the fuels (step 1300), as well as instruct burner 17 to activate (step 1400). As discussed above, burner 17 can be activated prior to the actuation of valves 46a and 46b, simultaneously activated with valves 46a and 46b, or activated immediately following actuation of valves 46a and 46b without departing from the scope of the present disclosure.

After actuation of valves 46a and 46b and burner 17, controller 36 or ECU 34 can instruct bleed valve 52 to open bleed passage 50 to allow a small amount of exhaust to begin entering SCR 20 (step 1500). By monitoring exhaust temperature downstream from SCR 20 (FIG. 1), it can be determined whether SCR 20 has sufficiently pre-heated (step 1600). Once SCR 20 has sufficiently pre-heated, controller 36 or ECU 34 can determine whether burner 17 has operated for a predetermined amount of time to prevent residual high-sulfur-containing fuel from reaching SCR 20 (step 1700). If burner 17 has operated for the predetermined amount of time, controller 36 or ECU 34 can instruct bleed valve 52 and by-pass valves 44 to close (step 1800) and instruct burner 17 to deactivate (step 1900).

Although operation of burner 17 has been described above relative to a fuel switch, it should be understood that operation of burner 17 can also assist in abating formation of ammonium bisulfate during periods of normal engine operation. SCR 20 is a porous substrate that absorbs urea exhaust treatment fluid as the urea is dosed into exhaust passage 14 and enters exhaust treatment device 18. Before dosing occurs, SCR 20 can be substantially devoid of any urea exhaust treatment fluid therein. As dosing begins, however, SCR 20 will relatively quickly absorb the urea exhaust treatment fluid and begin the process of reducing $NO_X$ to nitrogen gas ($N_2$) and water ($H_2O$).

When engine 12 is operating at a relatively high load, a temperature of the exhaust can typically be between 350-400 C. Further, during operation of engine 12 at this relatively high load, dosing module 22 is generally dosing the urea exhaust treatment fluid into the exhaust stream to reduce the $NO_X$ contained in the exhaust. Due to the simultaneous presence of urea and sulfur, formation of ammonium bisulfate can occur. Notwithstanding, when the exhaust temperature is greater than 350 C, the ammonium bisulfate is generally gaseous and passes through SCR 20 without substantially adhering thereto.

When the load of the engine 12 is reduced, the temperature of the exhaust can fall to a temperature in a range between 150 to 250 C. At temperatures less than 180 C, dosing of the urea exhaust treatment fluid can form deposits in exhaust passage 14. It may not be desirable, therefore, to operate dosing module 22 when the engine load has been reduced to avoid the formation of the deposits. Although dosing of the urea exhaust treatment fluid may be stopped due to the reduction in exhaust temperature, SCR 20 may still have a relatively high amount of urea absorbed therein. The formation of ammonium bisulfate, therefore, can still occur. Furthermore, at the reduced exhaust temperatures of 150 C to 250 C, the ammonium bisulfate can be in a liquid state that can adhere to SCR 20, which is undesirable.

In the event that engine load is reduced to an extent that the exhaust temperature will also be reduced and urea dosing ceased, burner 17 can be activated. When burner 17 is activated, the exhaust temperature can be maintained at a level (e.g., 350 C to 400 C) where ammonium bisulfate can be in a gaseous state that will continue to pass through SCR 20 without adhering thereto. Burner 17 can be operated for a period of time (e.g., 10-20 minutes) sufficient to ensure that any residual urea absorbed by SCR 20 will have fully reacted with the exhaust gases. The full period of time can be based on measurements taken by $NO_X$ sensor 32 (e.g., when the $NO_X$ content begins to rise, the SCR 20 is most likely devoid of urea). Once SCR 20 has completely dried out, burner 17 can be deactivated. Because urea is no longer in the exhaust stream, ammonium bisulfate is prevented from forming.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust system for a dual-fuel engine that is provided with a first fuel and a different second fuel for combustion, comprising:
   an exhaust passageway;
   an exhaust treatment component provided in the exhaust passageway, the exhaust treatment component being configured to treat exhaust from combustion of the second fuel and not from combustion of the first fuel;
   a thermal enhancement device in communication with the exhaust passageway and located upstream from the exhaust treatment component; and
   a controller configured to activate and deactivate the thermal enhancement device based on switching from the first fuel to the second fuel, wherein the first fuel has a higher sulfur content than the second fuel,
   wherein the thermal enhancement device increases a temperature of an exhaust to combust a residual amount of the first fuel present in the exhaust passageway during the switch between the first fuel and the second fuel.

2. The exhaust system of claim 1, wherein the exhaust treatment component is a selective catalytic reduction (SCR) component.

3. The exhaust system of claim 1, further comprising an exhaust by-pass pipe for by-passing the exhaust treatment component.

4. The exhaust system of claim 3, further comprising a valve that is operable to open and close the exhaust by-pass pipe.

5. The exhaust system of claim 3, further comprising a bleed passage in communication between the exhaust passageway and the exhaust by-pass pipe.

6. The exhaust system of claim 1, wherein the thermal enhancement device is activated before the switch, simultaneously with the switch, or immediately following the switch from the first fuel to the second fuel.

7. The exhaust system of claim 1, wherein the thermal enhancement device comprises a burner for combusting residual fuel present in the exhaust passageway prior to the residual fuel entering the exhaust treatment component.

8. The exhaust system of claim 1, wherein the thermal enhancement device is operated for a predetermined amount of time after the supply of the first fuel to the engine is discontinued.

9. The exhaust system of claim 1, wherein the exhaust generated by engine combustion of the first fuel escapes to atmosphere prior to entering the exhaust treatment component and the exhaust generated by engine combustion of the second fuel passes through the exhaust treatment component, wherein after discontinuing the supply of the first fuel to the ending, the residual amount of first fuel that was not combusted by the engine is combusted by the thermal enhancement device and the exhaust from the thermal enhancement device passes through the exhaust treatment component.

10. A method of treating exhaust produced by a dual-fuel engine that is operable to switch between a first fuel and a second fuel, comprising operating a thermal enhancement device that raises an exhaust temperature based on switching between the first fuel and the second fuel, further comprising operating the thermal enhancement device to combust a residual amount of the first fuel present in the exhaust emitted by the engine and supplying the exhaust from the thermal enhancement device to an exhaust treatment component.

11. The method of claim 10, wherein the first fuel has a greater sulfur content than the second fuel.

12. The method of claim 11, further comprising treating exhaust produced through combustion of the second fuel with the exhaust treatment component.

13. The method of claim 12, wherein the exhaust treatment component is an SCR.

14. The method of claim 13, further comprising expelling exhaust produced through combustion of the first fuel into the atmosphere before treating the exhaust produced through combustion of the second fuel with the exhaust treatment component.

15. The method of claim 11, wherein the thermal enhancement device is operated before switching the fuels, during switching of the fuels, or after switching of the fuels.

* * * * *